United States Patent
Thomas et al.

(10) Patent No.: US 9,154,206 B2
(45) Date of Patent: Oct. 6, 2015

(54) VERTICAL BEAM DESIGN FOR UE-SPECIFIC BEAMFORMING BY MATCHING TO A CB

(71) Applicant: Nokia Siemens Networks Oy, Espoo (FI)

(72) Inventors: Timothy Thomas, Palatine, IL (US); Frederick Vook, Schaumburg, IL (US); Eugene Visotsky, Buffalo Grove, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 13/929,944

(22) Filed: Jun. 28, 2013

(65) Prior Publication Data

US 2015/0003548 A1    Jan. 1, 2015

(51) Int. Cl.
*H04K 1/10*      (2006.01)
*H04B 7/04*      (2006.01)
*H04B 7/06*      (2006.01)

(52) U.S. Cl.
CPC ............ *H04B 7/0478* (2013.01); *H04B 7/0421* (2013.01); *H04B 7/0617* (2013.01); *H04B 7/0639* (2013.01)

(58) Field of Classification Search
CPC .. H04B 7/0478; H04B 7/0417; H04B 7/0469; H04B 7/0456; H04B 7/0639; H04B 7/0617; H04B 7/0634; H04B 7/0482; H04B 7/0619; H04B 7/0802; H04B 7/086
USPC .......... 375/267, 260, 295, 316; 370/203, 204, 370/208, 209
See application file for complete search history.

(56) References Cited

U.S. PATENT DOCUMENTS

2011/0103504 A1   5/2011  Ma
2013/0229980 A1*  9/2013  Wernersson et al. ......... 370/328

FOREIGN PATENT DOCUMENTS

EP           2747304 A1      6/2014

OTHER PUBLICATIONS

3GPP TR 37.840 V12.0.0; "3$^{rd}$ Generation Partnership Project; Technical Specification Group Radio Access Network; Study of Radio Frequency (RF) and Electromagnetic Compatibility (EMC) requirements for Active Antenna Array System (AAS) base station (Release 12)"; Mar. 2013; whole document (84 pages).
R1-112420; Alcatel-Lucent Shanghai Bell, Alcatel-Lucent; "Considerations on CSI feedback enhancements for high-priority antenna configurations"; 3GPP TSG-RAN WG1 #66; Athens, Greece, Aug. 22-26, 2011.

* cited by examiner

*Primary Examiner* — Dhaval Patel
(74) *Attorney, Agent, or Firm* — Harrington & Smith

(57) ABSTRACT

A method includes transmitting reference signals to user equipment from an active antenna array system including a multiple of antennas arrayed in at least a vertical direction. The active antenna array system is configured to perform the transmitting of the reference signals using multiple vertical beams having vertical patterns designed to provide desired vertical patterns after codebook feedback from a codebook is applied on transmissions from logical ports of the antenna array. The method includes receiving codebook feedback from the user equipment in response to transmitting the reference signals. The method includes transmitting information to the user equipment at least by applying selected entries of the codebook corresponding to the codebook feedback to the logical ports of the antenna array, wherein application of the selected entries causes the active antenna array system to perform transmitting information using multiple beams having the desired vertical patterns. Apparatus and program products are disclosed.

20 Claims, 13 Drawing Sheets

VERTICAL BEAM DESIGN FOR UE-SPECIFIC BEAMFORMING BY MATCHING TO A CB

TECHNICAL FIELD

This invention relates generally to wireless transmissions and, more specifically, relates to antenna and codebook (CB) usage in wireless transmissions to communicate with user equipment (UEs).

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below at the end of the specification but prior to the claims.

There has been recent interest in antenna systems that allow antenna beam patterns to be manipulated in the elevation dimension in addition to the azimuth dimension. For instance, a base station may choose to "point" beams "upward" toward user equipment that is near an edge of the cell. Similarly, the base station may choose to point beams downward toward user equipment that are in the middle of the cell or close to the base station. This beam pattern manipulation can provide an improvement for the user equipment within the beam and may also provide less interference for the user equipment (or small cells) not within the beam.

One technique for directing the beams is using an antenna array that provides mechanical downtilt. Another technique (which may be combined with mechanical downtilt) is by dynamically adjusting the radiation patterns of an active antenna system. In particular, in a base station equipped with an antenna array system, the radiation pattern of the antenna array system may be dynamically adjustable. This adjustment may be performed with feedback from the user equipment (UE) where the feedback is an index of a matrix or vector from a codebook containing multiple matrices or vectors. However since codebooks are pre-defined (e.g., by a standards body) the resulting beam pattern after applying the selected matrix or vector will not match the desired pattern.

Although these techniques provide certain benefits, the use of these techniques could be improved.

SUMMARY

This section contains examples of possible implementations and is not meant to be limiting.

In an exemplary embodiment, a method is disclosed that includes transmitting reference signals to user equipment from an active antenna array system comprising a plurality of antennas arrayed in at least a vertical direction. The active antenna array system is configured to perform the transmitting of the reference signals using multiple vertical beams having vertical patterns designed to provide desired vertical patterns after codebook feedback from a codebook is applied on transmissions from logical ports of the antenna array. The method includes receiving codebook feedback from the user equipment in response to transmitting the reference signals. The method further includes transmitting information to the user equipment at least by applying selected entries of the codebook corresponding to the codebook feedback to the logical ports of the antenna array, wherein application of the selected entries causes the active antenna array system to perform transmitting information using multiple beams having the desired vertical patterns.

An exemplary apparatus comprises: means for transmitting reference signals to user equipment from an active antenna array system comprising a plurality of antennas arrayed in at least a vertical direction, the active antenna array system configured to perform the transmitting of the reference signals using multiple vertical beams having vertical patterns designed to provide desired vertical patterns after codebook feedback from a codebook is applied on transmissions from logical ports of the antenna array; means for receiving codebook feedback from the user equipment in response to transmitting the reference signals; and means for transmitting information to the user equipment at least by applying selected entries of the codebook corresponding to the codebook feedback to the logical ports of the antenna array, wherein application of the selected entries causes the active antenna array system to perform transmitting information using multiple beams having the desired vertical patterns.

An exemplary apparatus includes one or more processors and one or more memories including computer program code. The one or more memories and the computer program code are configured to, with the one or more processors, cause the apparatus to perform at least the following: transmitting reference signals to user equipment from an active antenna array system comprising a plurality of antennas arrayed in at least a vertical direction, the active antenna array system configured to perform the transmitting of the reference signals using multiple vertical beams having vertical patterns designed to provide desired vertical patterns after codebook feedback from a codebook is applied on transmissions from logical ports of the antenna array; receiving codebook feedback from the user equipment in response to transmitting the reference signals; and transmitting information to the user equipment at least by applying selected entries of the codebook corresponding to the codebook feedback to the logical ports of the antenna array, wherein application of the selected entries causes the active antenna array system to perform transmitting information using multiple beams having the desired vertical patterns.

An exemplary computer program product includes a memory bearing computer program code embodied therein for use with a computer, the computer program code including: transmitting reference signals to user equipment from an active antenna array system comprising a plurality of antennas arrayed in at least a vertical direction, the active antenna array system configured to perform the transmitting of the reference signals using multiple vertical beams having vertical patterns designed to provide desired vertical patterns after codebook feedback from a codebook is applied on transmissions from logical ports of the antenna array; receiving codebook feedback from the user equipment in response to transmitting the reference signals; and transmitting information to the user equipment at least by applying selected entries of the codebook corresponding to the codebook feedback to the logical ports of the antenna array, wherein application of the selected entries causes the active antenna array system to perform transmitting information using multiple beams having the desired vertical patterns.

BRIEF DESCRIPTION OF THE DRAWINGS

In the attached Drawing Figures:

FIG. 10A is graph of gain of two beams created with an embodiment of the invention, while

DETAILED DESCRIPTION OF THE DRAWINGS

Figure 1:
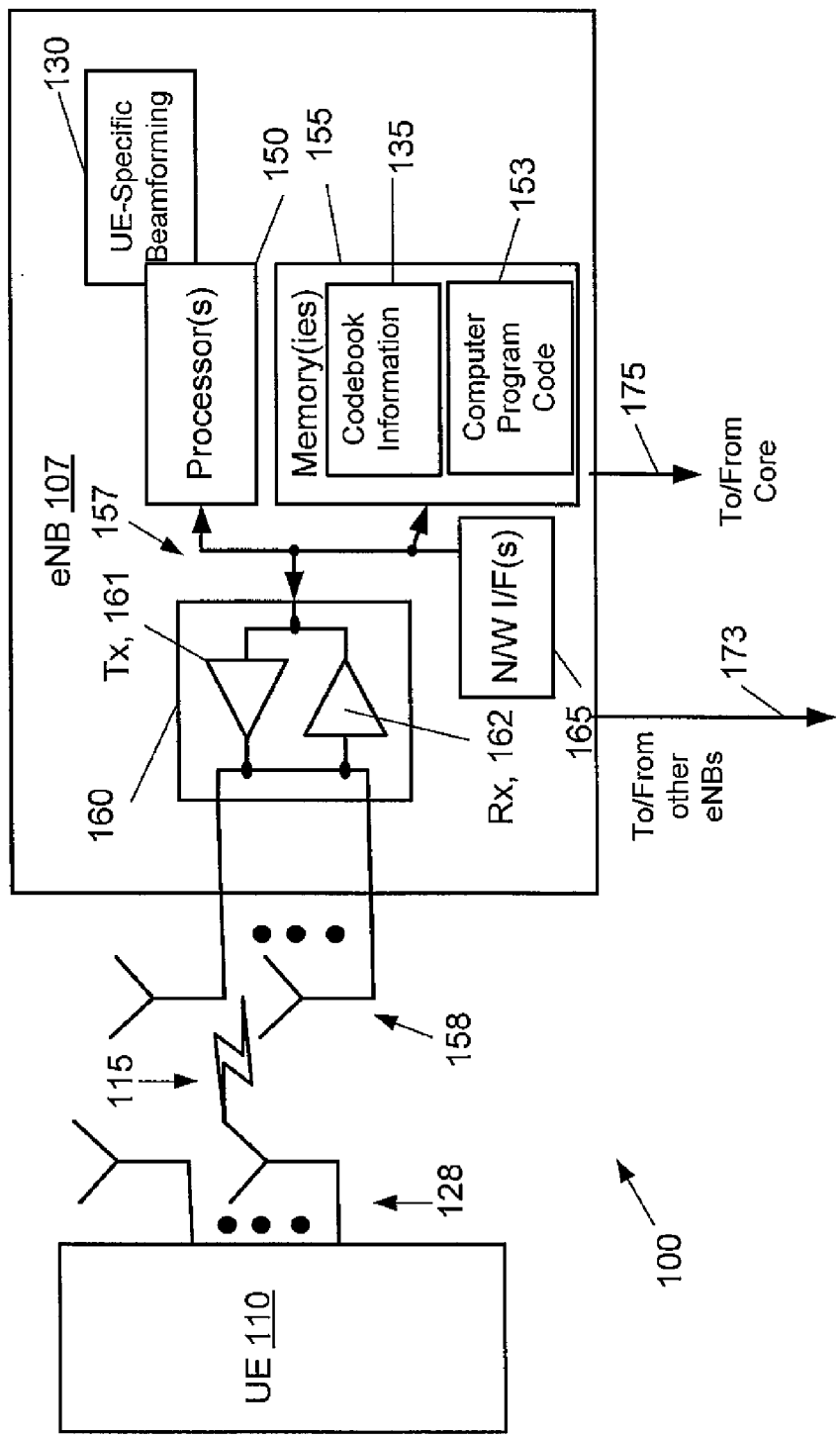
FIG. 1 illustrates an exemplary system in which the exemplary embodiments may be practiced.

Before proceeding with description of additional problems with conventional systems and how exemplary embodiments address these problems, reference is now made to FIG. 1, which illustrates an exemplary system in which the exemplary embodiments may be practiced. In FIG. 1, a user equipment (UE) 110 is in wireless communication with a wireless network 100 via a wireless link 115 with eNB 107, which is an LTE base station (in this example) providing access to and from the wireless network 100. The user equipment 110 includes one or more antennas 128.

The wireless network 100 includes the eNB 107. Although an LTE base station is used herein as an example, the exemplary embodiments are applicable to any wireless transmission system. The eNB 107 creates one or more cells and includes one or more processors 150, one or more memories 155, one or more network interfaces (N/WI/F(s)) 165, and one or more transceivers 160 (each comprising a transmitter, Tx, 161 and a receiver, Rx, 162) interconnected through one or more buses 157. The one or more transceivers are connected to the antenna array 158. The antenna array 158 may be formed to provide a mechanical downtilt capability. The one or more memories 155 include computer program code 153. A UE-specific beamforming module (e.g., or means) 130 may be implemented via the computer program code 153, via circuitry such as circuitry in the one or more processors 150, or via a combination of these. In an exemplary embodiment, the one or more memories 155 and the computer program code 153 are configured to, with the one or more processors 150, cause the eNB 107 to perform one or more of the operations as described herein. The one or more memories include codebook information 135, which is used by the UE-specific beamforming module 130 to perform UE-specific beamforming as described below. In a simple example, the codebook information 135 includes weights to be used for transmission to UEs 110 and also may include a codebook (e.g., an LTE codebook).

The one or more network interfaces 165 communicate over networks such as the networks 173, 175. The eNB 107 may communicate with other eNBs using, e.g., network 173. The network 173 may be wired or wireless or both and may implement, e.g., an X2 interface. The eNB 107 may use the network 175 to communicate with a core portion of the wireless network 100.

The computer readable memory 155 may be of any type suitable to the local technical environment and may be implemented using any suitable data storage technology, such as semiconductor based memory devices, flash memory, magnetic memory devices and systems, optical memory devices and systems, fixed memory and removable memory. The processor(s) 150 may be of any type suitable to the local technical environment, and may include one or more of general purpose computers, special purpose computers, general or special purpose integrated circuits, microprocessors, digital signal processors (DSPs) and processors based on a multi-core processor architecture, as non-limiting examples.

Figure 2:
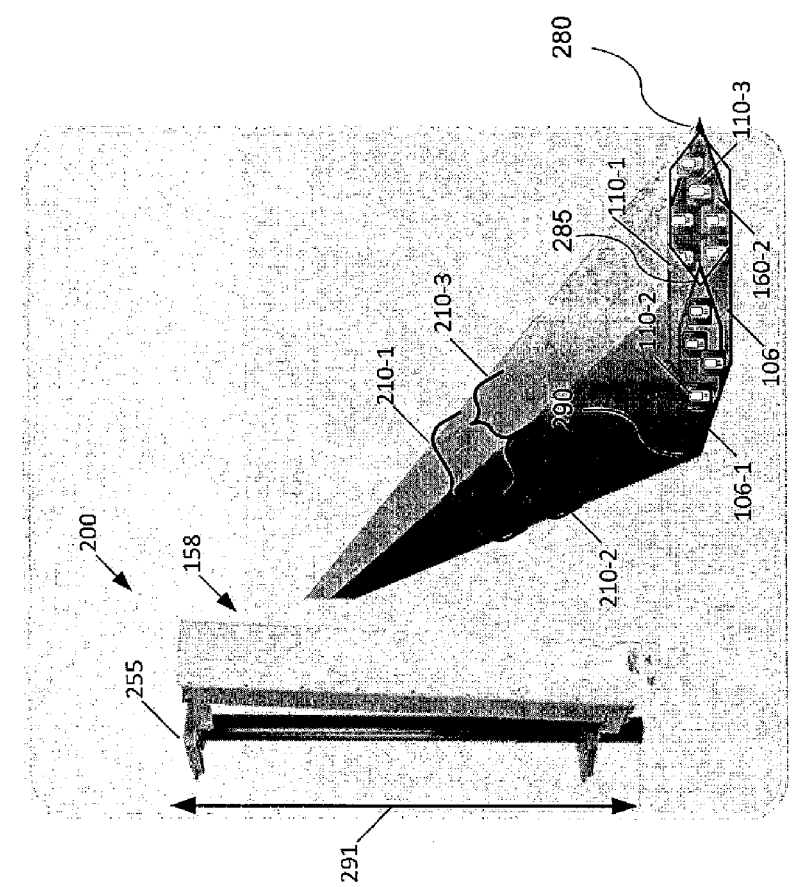
FIG. 2 illustrates a portion of an active antenna system performing vertical sectorization.

FIG. 2 illustrates a portion of an active antenna system 200 performing vertical sectorization. The portion of the active antenna system 200 includes in this example a downtilt system 255 and the antenna array 158, which includes a plurality of antennas (see FIG. 1) arrayed in at least a vertical direction 291. In this example, there is a cell 106 that is defined by the active antenna system 200, and the antenna array 158 having a particular geometry, of the eNB 107. There are a number of UEs 110 in the cell 106, some of which are near the outside edge 280, some near the center 285 and some near an inner edge 290 of the cell 106. The terms "inner" and "outer" are relative to the antenna array 158: "inner" is closer to the antenna array 158 and "outer" is farther from the antenna array 158.

It is noted that description herein indicates that "cells" perform functions, but it should be clear that the eNB that forms the cell will perform the functions. The cell makes up part of an eNB. That is, there can be multiple cells per eNB. For instance, there could be three cells for a single eNB carrier frequency and associated bandwidth, each cell covering one-third of a 360 degree area so that the single eNB's coverage area covers an approximate oval or circle. Furthermore, each cell can correspond to a single carrier and an eNB may use multiple carriers. So if there are three 120 degree cells per carrier and two carriers, then the eNB has a total of 6 cells. For ease of reference, cells and their coverage areas are referred to as cells herein, and the cells are discussed as performing actions (which would be performed by the corresponding eNB).

A classical system would use the antenna array 158 to create the cell (a single vertical sector) 106 via the beam 210-1, which would be able to communicate with all UEs 110, of which three are referenced in FIG. 2. With sector-specific elevation beamforming, the smaller cell portion (a vertical sector) 106-1 may be created using beam 210-2 or the cell portion (another vertical sector) 106-2 may be created using beam 210-3. This would also occur with UE-specific beamforming, e.g., if the coverage cell 106 performs beamforming to target UE 110-2 or alternatively 110-3.

Although shown for vertical sectorization, FIG. 2 also demonstrates that two non-overlapping elevation beams may be desirable for UE-specific elevation beamforming. For example, with two non-overlapping beams as shown in FIG. 2, a transmit beam selection approach could be used wherein the beam that points up would be selected to transmit to far-out users and the beam that points down would be selected to transmit to near-in users. However with codebook feedback from the UE these non-overlapping beams that point up and down in the manner shown for example in FIG. 2 are not possible to achieve unless the codebook has a specific design which is usually not included in typical codebook feedback systems like LTE. For example, the codebook for the LTE downlink does not have the ability to select one antenna or beam (i.e., the codebook does not include weight vectors that have a single one with the rest as zeros), so using the current LTE codebook would not enable the transmission from only one of the two non-overlapping beams as shown in FIG. 2. To obtain these desired beams after codebook feedback is applied at the transmitter, the transmission across the vertical elements needs to be tailored in a specific way as will be described below.

The instant exemplary embodiments provide techniques for codebook partitioning for enabling vertical beam design for UE-specific beamforming by matching to a codebook such as the LTE codebook. Before proceeding with a description of exemplary embodiments, it is helpful to review techniques for vertical beamforming.

Figure 3:
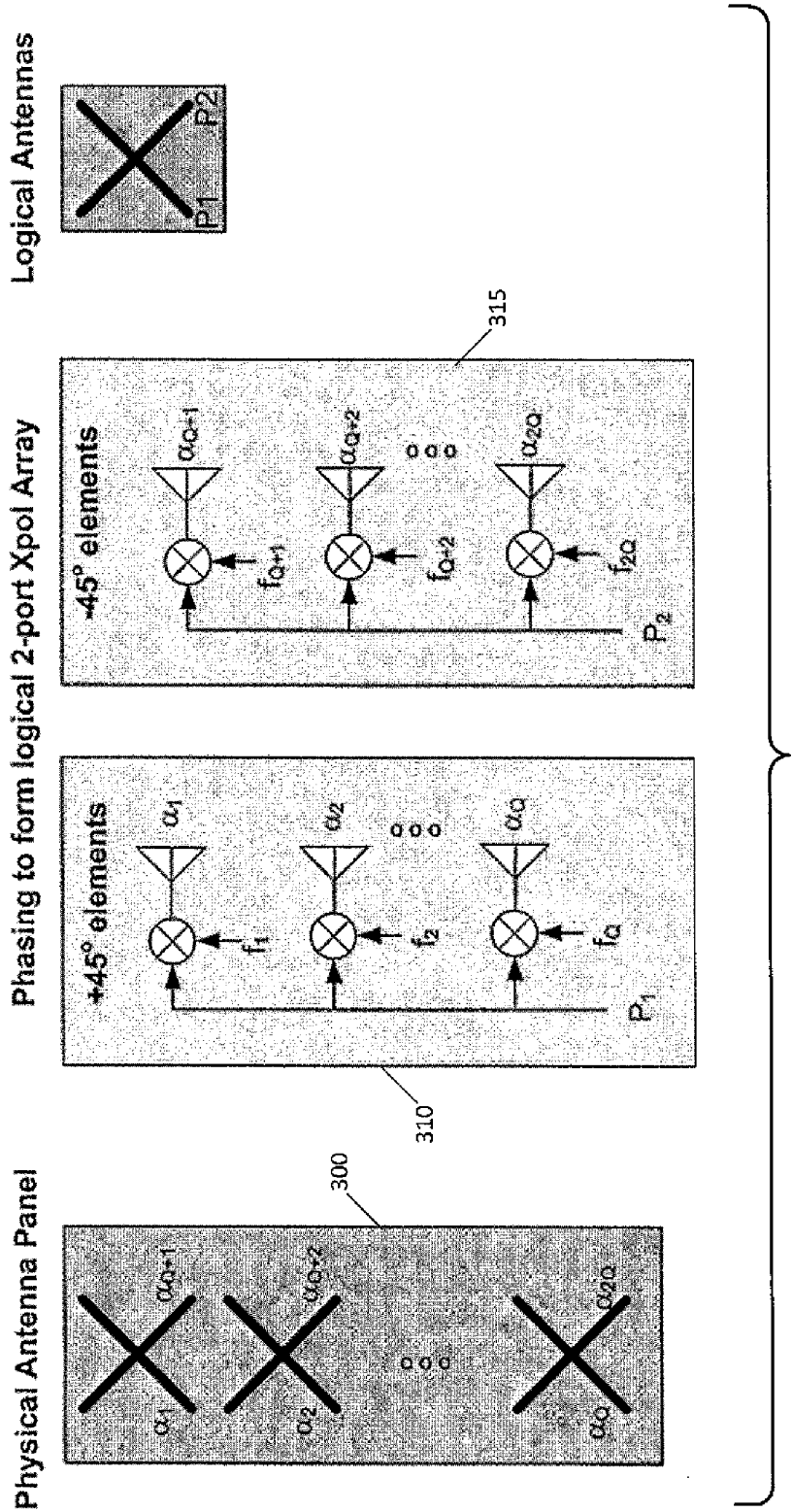
FIG. 3 is a block diagram of how an existing active antenna system is used to form a desired vertical pattern.

Concerning beamforming using an active antenna system, FIG. 3 is a block diagram of how an existing active antenna system is used to form a single desired vertical pattern per polarization. Existing antenna 1 panels typically already have vertical elements phased to form a desired vertical pattern. An example, as shown in FIG. 3 is Q physical sub-elements in elevation per polarization. In this example, the physical antenna panel 300 (e.g., an antenna array 158) includes $\alpha_1$ to $\alpha_Q$ +45 degree (°) antenna elements and $\alpha_{Q+1}$ to $\alpha_{2Q}$ −45 degree)(° antenna elements. To form logical antenna P1, phasing $f_1$ to $f_Q$ is applied to the +45° antenna elements by a phasing array 310, and to form logical antenna P2, phasing $f_{Q+1}$ to $f_{2Q}$ is applied to the −45° antenna elements by a phasing array 315, respectively. Mechanical downtilt (e.g., using downtilt system 255) can also be used to optimize cell coverage. Elevation pattern is typically very narrow in macrocells to increase the overall antenna gain and to cover the cell from a high tower.

Figure 4:
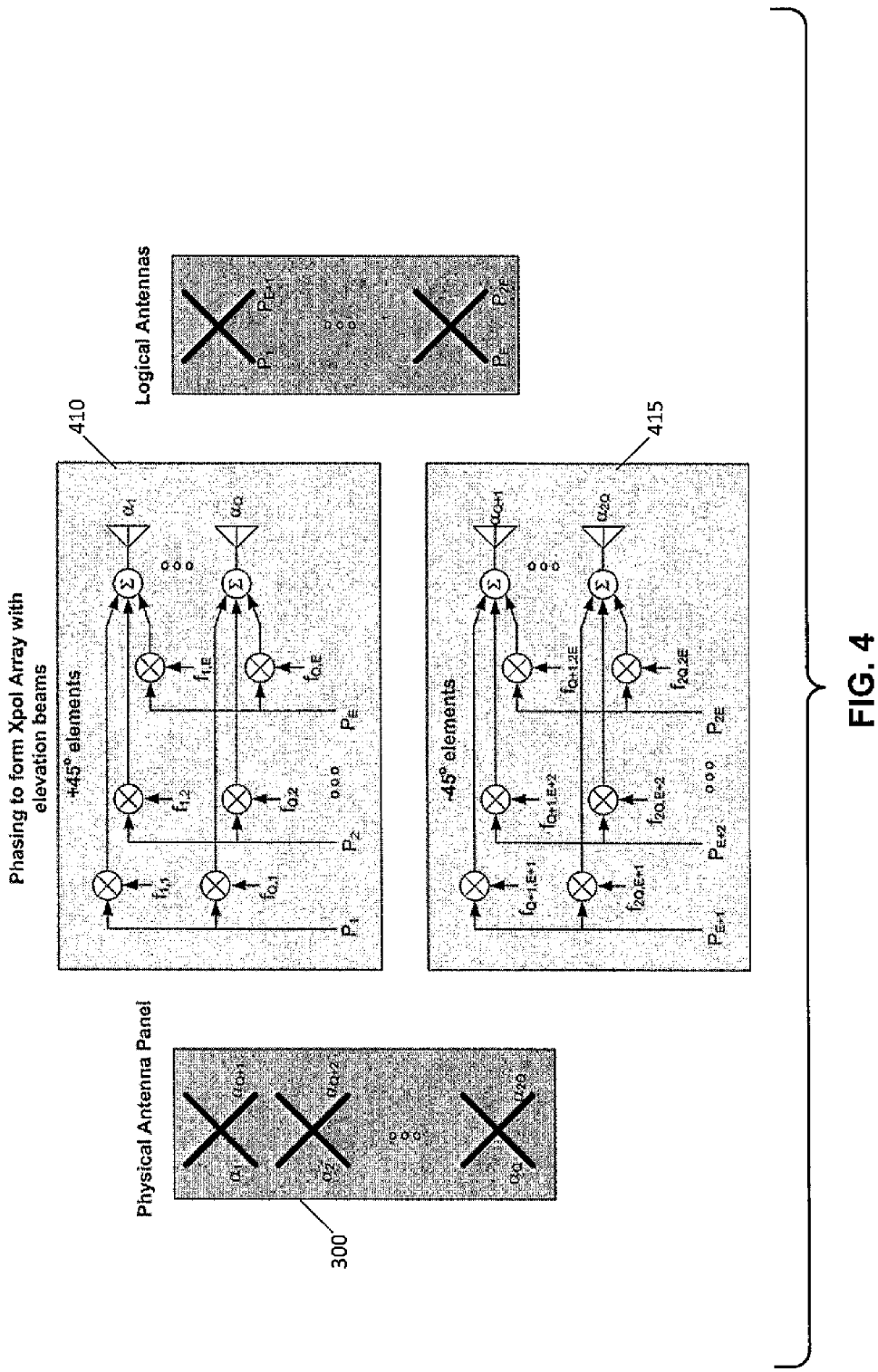
FIG. 4 is an example of using an antenna array to form vertical beams using all vertical antenna sub-elements.
Figure 5:
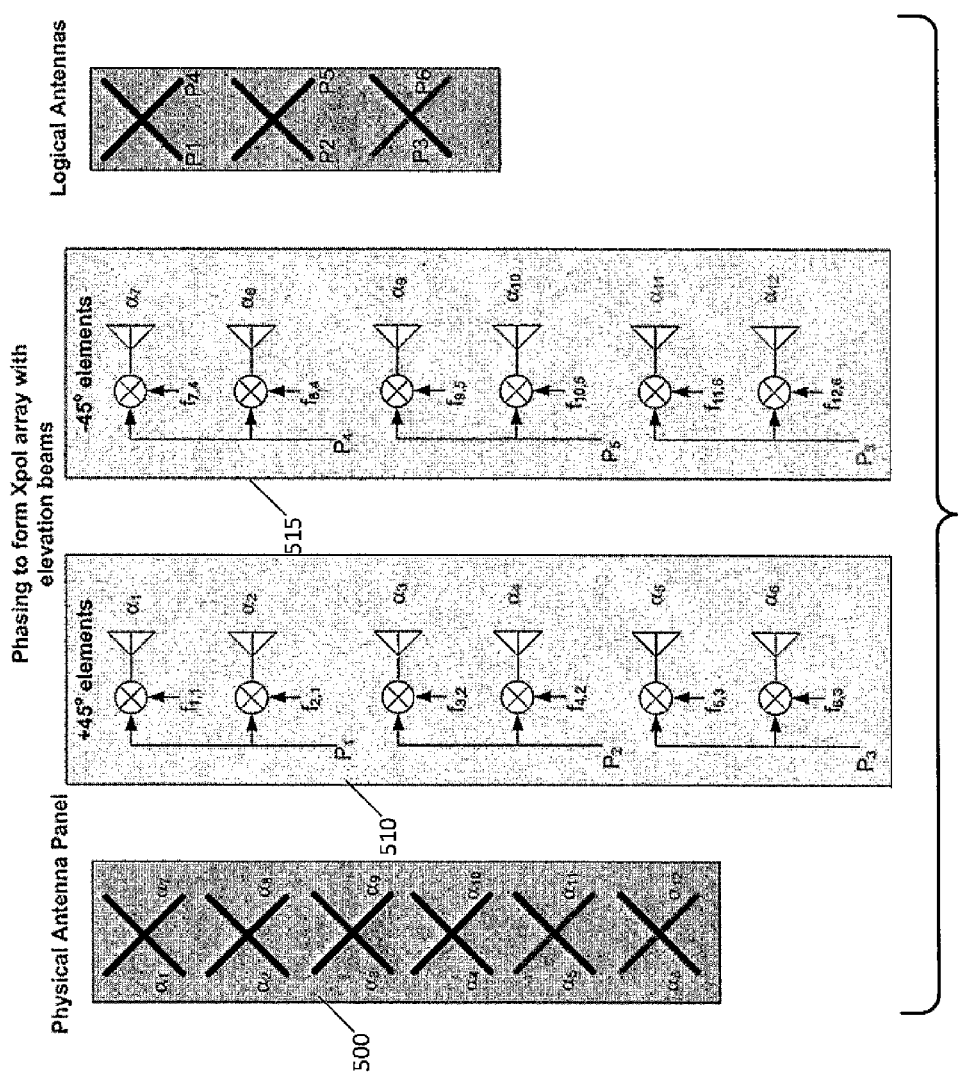
FIG. 5 is an example of using an antenna array to form vertical beams using disjoint subsets of vertical antenna sub-elements.

It is possible to modify the beamforming used in the physical antenna panel 300 to provide reduced-order control of the vertical dimension with performance similar to full control. For each polarization, multiple vertical beams may be formed using multiple logical vertical elements. An example is Q=10 physical elements with two vertical logical antennas per polarization −2 RF chains per polarization rather than 10 RF chains. FIGS. 4 and 5 are examples of using modified antenna panels.

FIG. 4 is an example of using an antenna array to form E vertical ports per polarization using all vertical antenna sub-elements. To form logical antennas $P_1$ to $P_E$, phasing $f_{1,1}$ to $f_{1,E}$ and $f_{Q,1}$ to $f_{Q,E}$ is applied to the +45° antenna elements by a phasing array 410, and to form logical antennas $P_{E+1}$ to $P_{2E}$, phasing $f_{Q+1,E+1}$ to $f_{Q+1,2E}$ and $f_{2Q,E+1}$ to $f_{2Q,2E}$ is applied to the −45° antenna elements by a phasing array 415. The phasing values $f_{1,1}$ through $f_{Q,1}$ are the vertical beam for logical port $P_1$, the phasing values $f_{1,2}$ through $f_{Q,2}$ are the vertical beam for logical port $P_2$, and so forth. The phasing values $f_{Q+1,E+1}$ through $f_{2Q,E+1}$ are the vertical beam for logical port $P_{E+1}$, the phasing values $f_{Q+1,E+2}$ through $f_{2Q,E+2}$ are the vertical beam for logical port $P_{E+2}$, and so forth. Typically the phasing across the two polarizations is performed similarly (e.g., that $f_{1,1}=f_{Q+1,1,1}$, $f_{2,1}=f_{Q+2,1}$ and so forth).

There are 2Q total sub-elements in the panel 300, and Q vertical elements per polarization in the panel. It is possible to form E vertical beams from the Q elements for each polarization, where E is the number of ports per polarization. The result is that the panel 200 forms a logical E×2 vertical array of cross polarized beams (i.e., E vertical beams with two vertical elements from the original single sector). The E vertical beams are phased on a per-UE basis to create a signal tailored to each UE.

FIG. 5 is an example of using an antenna array to form 3 vertical ports per polarization using disjoint subsets of vertical antenna sub-elements. To form logical antenna $P_1$, phasing $f_{1,1}$ and $f_{2,1}$ is applied to the +45° antenna elements $\alpha_1$ and $\alpha_2$ by a phasing array 510; to form logical antenna $P_2$, phasing $f_{3,2}$ and $f_{4,2}$ is applied to the +45° antenna elements $\alpha_3$ and $\alpha_4$ by the phasing array 510; and to form logical antenna $P_3$, phasing $f_{5,3}$ and $f_{6,3}$ is applied to the +45° antenna elements $\alpha_5$ and $\alpha_6$ by the phasing array 510. Similarly, to form logical antenna $P_4$, phasing $f_{7,4}$ and $f_{8,4}$ is applied to the −45° antenna elements $\alpha_7$ and $\alpha_8$ by a phasing array 515; to form logical antenna $P_5$, phasing $f_{9,5}$ and $f_{10,5}$ is applied to the −45° antenna elements $\alpha_9$ and $\alpha_{10}$ by the phasing array 515; and to form logical antenna $P_6$, phasing $f_{11,6}$ and $f_{12,6}$ is applied to the −45° antenna elements $\alpha_{11}$ and $\alpha_{12}$ by the phasing array 515.

Figure 6:
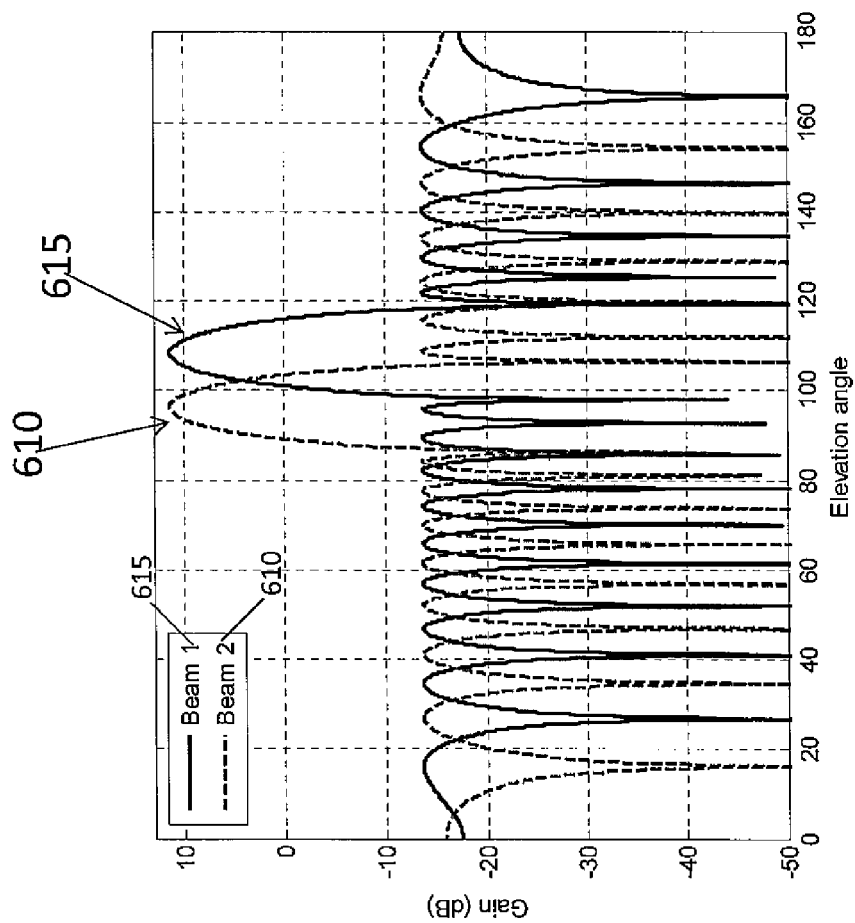
FIG. 6 is a graph of gain of two beams for a beamspace example using an elevation pattern of two logical vertical ports (E=2)

FIG. 6 is a graph of the gain of two beams for a beamspace example using an elevation pattern of two logical vertical ports (E=2). We refer to these beams as being non-overlapping meaning that the main lobes of the two beams do not substantially overlap (i.e., only slightly overlap in some small region). This example used two vertical ports (E=2) formed from Q=10 vertical physical sub-elements (15 degree nominal downtilt assumed). This example assumes the antenna array 158 is vertical and the "broadside" refers to a perpendicular relationship with the vertical antenna array 158. The angle of 90 degrees is assumed to be at some (e.g., central) vertical location on the antenna array 158 and angles greater than 90 degrees would refer to being below the antenna array (i.e., are below the eNB). The UEs at cell-edge 280 prefer beam 610, while the UEs closer to the eNB (e.g., near the center 285 or the inner edge 290) prefer beam 615, since beam 610 is pointed more downward than is beam 615. An issue is that the LTE 4 Tx codebook (CB) has constant modulus entries which make beam selection not possible. This means that if the non-overlapping beams shown in FIG. 6 are used as the beam weights in FIG. 4, then the resulting beam pattern after applying the codebook would no longer be non-overlapping. The description below explains examples of how to best design beam weights (i.e., the $f_{i,j}$ values) for FIG. 4 or FIG. 5 for use with codebooks to obtain some desired final elevation pattern once the codebook weights are applied to the virtual ports (e.g., design beam weights so that the result after applying the codebook to the virtual ports is to end up with the non-overlapping beams of FIG. 6). Current LTE codebooks are used, but these are merely exemplary.

Regarding the LTE 4 Tx codebook, this codebook is used for the case of E=2 vertical beams with two azimuth (polarization) elements. The inventors have observed that, given an expected low elevation spread (that is, the rays of the channel do not vary much in the vertical direction from some mean), both polarizations likely use the same elevation weights.

Figure 7:
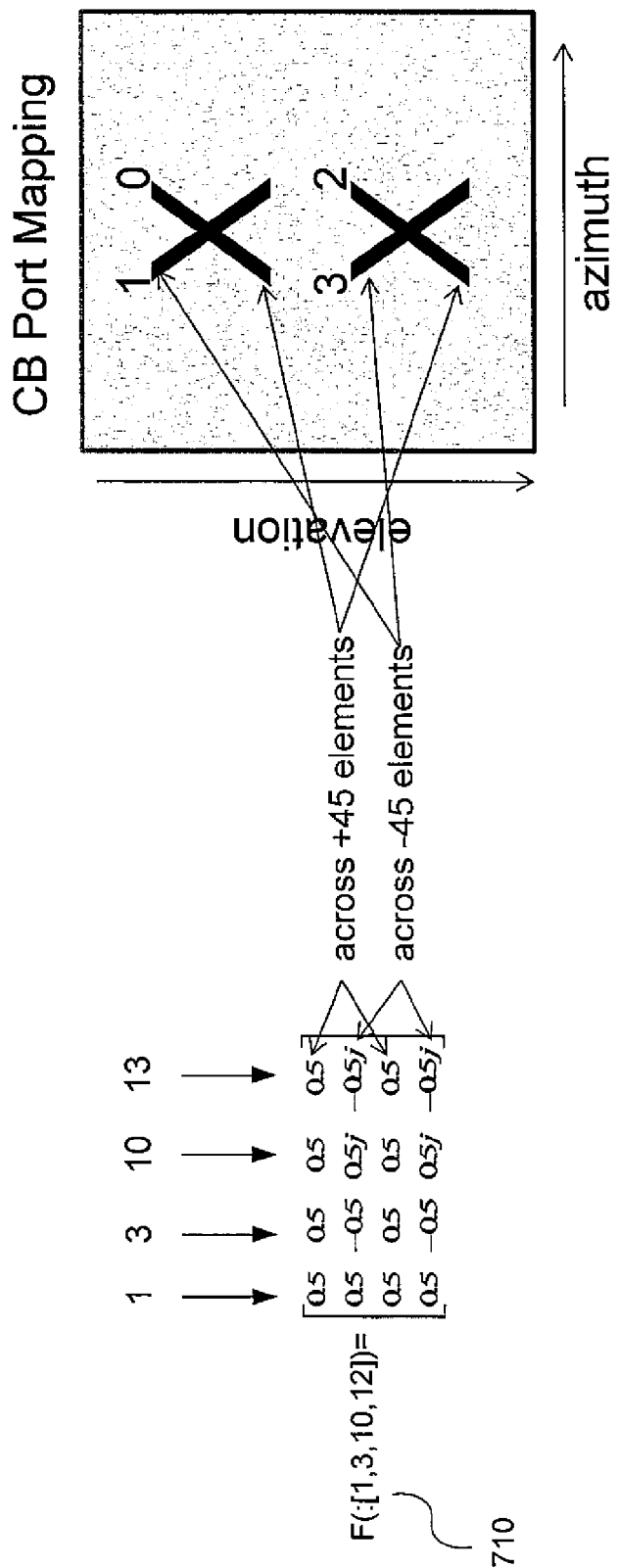
FIG. 7 is an illustration of port mapping for a rank 1 (one) LTE 4 (four) Tx codebook, where "4 Tx" indicates four transmission antennas are used.

Assume that a rank 1 (one) LTE 4 Tx CB, shown as "F" in FIG. 7, uses the port mapping shown in FIG. 7. Rank n means that there are n spatial data streams being sent to the UE. The "F(:,[1, 3, 10, 12])" means that columns 1, 3, 10, and 12 (from left to right) are selected from the codebook F(·) 710. For the LTE rank 1 codebook, codebook entries 1, 3, 10, and 12 have [1, 1] (sum) weighting of elevation beams/ports (each column in the codebook is a codeword), as shown in FIG. 7 (in other words the codebook entries are the same across the two elevation beams (ports) for a given polarization). Codebook entries 2, 4, 9, and 11 (not shown in FIG. 7) have [1, −1] (difference) weighting of the elevation beams/ports (in other words the codebook entry on one elevation beam (port) for a given polarization is the negative of the codebook entry on the other elevation beam (port) for a given polarization).

For a rank 2 (two) LTE 4 Tx codebook, codebook entry 12 has a [1,1] weighting of the elevation beams (ports). Codebook entry 11 has a [1,−1] weighting of the elevation beams (ports).

An issue is that using the LTE codebook will not enable beam selection. That is, one cannot select [1,0] or [0,1] weighting of the elevation beams since the codebook does not contain these entries. Therefore if it is desired to use a certain elevation beam for the final transmission when using codebook weights to beamform the elevation ports, then that desired elevation beam cannot be used as the beam weights (the $f_{i,j}$'s) in FIG. 4 and FIG. 5. Exemplary embodiments below provide techniques to design two elevation beams which enable beam selection when using the LTE codebook.

Figure 8:
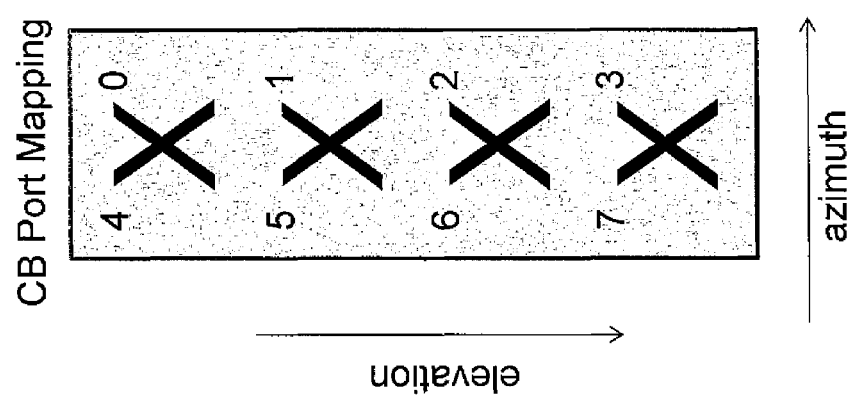
FIG. 8 is an illustration of port mapping for LTE 8 Tx codebook, where "8 Tx" indicates eight transmission antennas are used.

Turning to FIG. 8, this figure is an illustration of port mapping for the LTE 8 Tx codebook. The 8 Tx codebook is used for a case of E=4 vertical beams with 2 azimuth (polarization) elements. In this codebook, the following observations are made: For rank 1, all of the CB entries have a product structure; and for rank 2, half of the CB entries have a product structure. A product structure means that, e.g., a 8×r codebook entry (where r is the rank of the codebook) is broken up into the Kronecker product of a 4×1 vector times a 2×r matrix (a 8×r codebook entry is broken up into the Kronecker product of a 4×1 elevation vector by a 2×r azimuth matrix). The product structure is important because then the same weights are applied across the elevation ports for each polarization.

An issue concerning the 8 Tx LTE codebook is that, as in the case of the 4 Tx LTE codebook, using the LTE 8 Tx codebook will not enable beam selection. That is, one cannot select [1,0,0,0], [0,1,0,0], [0,0,1,0], or [0,0,0,1] weighting of the elevation beams since those entries are not present in the 8 Tx LTE codebook. Exemplary embodiments herein provide examples on how to design 4 elevation (E) beams which enable beam selection when using the LTE codebook.

The exemplary embodiments herein address how to generate fixed vertical beams that enable beam selection when using the LTE codebook, may provide nulls to reduce DL out-of-cell interference, and are orthogonal to each other. Further, the exemplary embodiments also may be structured to enable different beam widths for each beam (after LTE codebook is applied). For instance, an eNB may want a narrow beam for cell-edge UEs because the majority of UEs are geographically further from the base (assuming a uniform UE population). Meanwhile, UEs close in (to the eNB's antennas) may prefer a wider beam.

Figure 9:
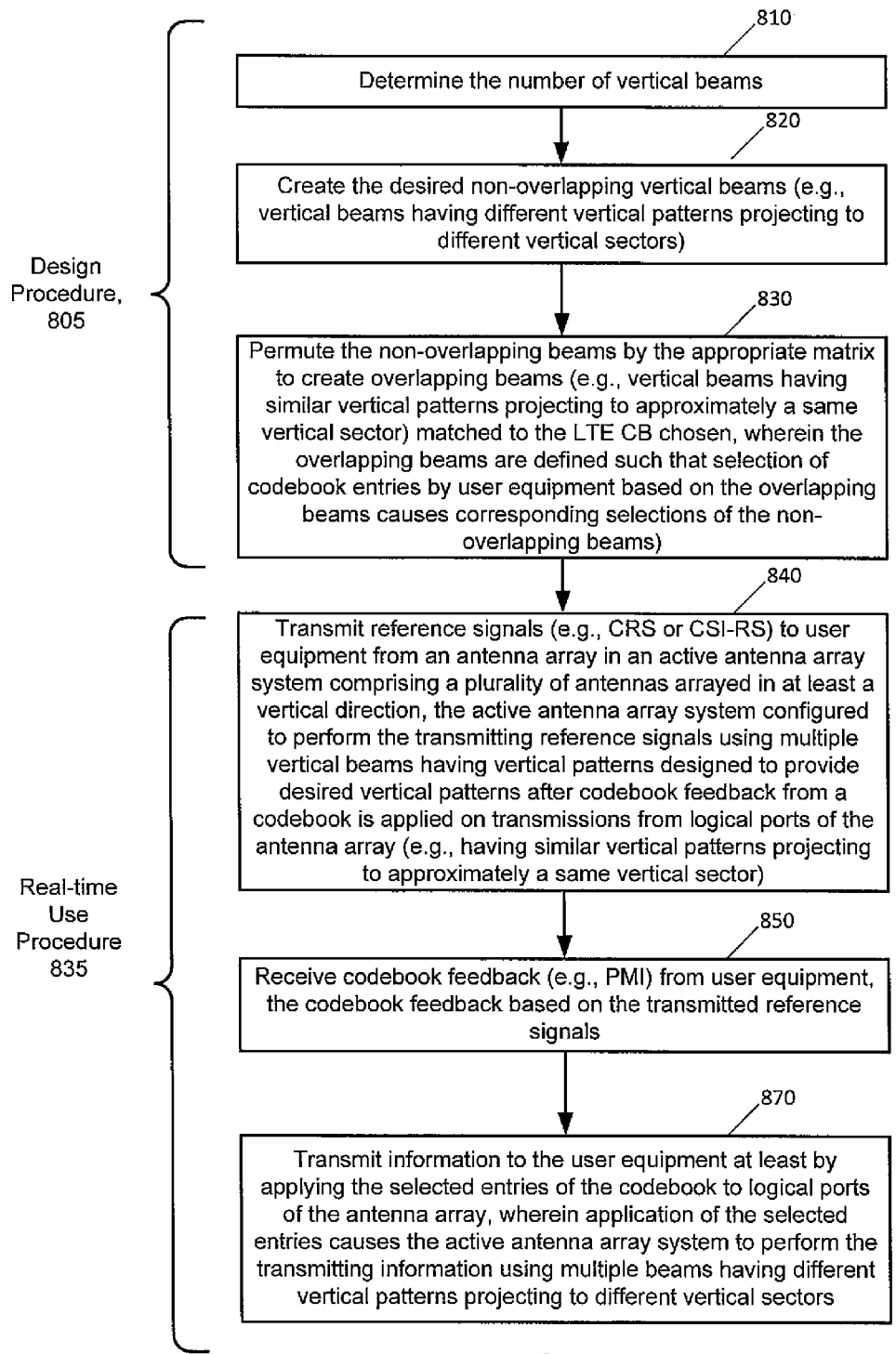
FIG. 9 is a block diagram of an exemplary logic flow diagram for vertical beam design for UE-specific beamforming by matching to LTE CB, and that illustrates the operation of an exemplary method, a result of execution of computer program instructions embodied on a computer readable memory, and/or functions performed by logic implemented in hardware, in accordance with exemplary embodiments herein.

An exemplary design procedure to generate fixed vertical beams that enable beam selection in the elevation domain or some other desired elevation pattern when using the LTE codebook is as follows. Note that the design procedure (e.g., 805) is not performed in real-time. Instead, the design procedure is performed once and then integrated into an eNB and its antenna system (e.g., by phasing the elevation antennas to create E ports per polarization as shown in FIG. 4 and FIG. 5). An exemplary design procedure 805 is explained in part through reference to FIG. 9. FIG. 9 is a block diagram of an exemplary logic flow diagram for vertical beam design for UE-specific beamforming by matching to LTE CB. FIG. 9 also illustrates the operation of an exemplary method, a result of execution of computer program instructions embodied on a computer readable memory, and/or functions performed by logic implemented in hardware, in accordance with exemplary embodiments herein.

Blocks 810, 820, and 830 are part of the design procedure 805 for the exemplary non-overlapping vertical beams as the desired vertical beams (although the non-overlapping vertical beams can be replaced by any desired vertical beams). In block 810, the number of vertical beams is determined. For instance, two vertical beams would use the 4 Tx LTE CB, or four vertical beams which use the 8 Tx LTE CB. In block 820, the desired non-overlapping vertical beams (i.e., the desired beams after the LTE codebook is applied) are created. The non-overlapping vertical beams are vertical beams having different vertical patterns projecting to different vertical directions (e.g., the different vertical sectors of FIG. 2). The beams, as described above, may provide nulls or low sidelobes to reduce DL out-of-cell interference, and may be structured to enable different beam widths for each beam. In block 830, the beams are permuted by the appropriate matrix (a 2×2 matrix or a 4×4 matrix) to create over-lapping beams matched to the LTE CB chosen (see below for example matrices). The overlapping beams are vertical beams having similar vertical patterns projecting to approximately a same vertical sector. The overlapping beams are defined such that selection of codebook entries which have the aforementioned product structure by user equipment based on the overlapping beams causes the corresponding selection of one of the non-overlapping beams to be the resulting beam pattern. Note that blocks 810, 820, and 830 would be performed by a system design engineer before deployment. The system design engineer would create the beam weights ($f_{i,j}$'s from FIG. 4 or FIG. 5) and the eNB would be deployed with those beam weights. The system design engineer would have to know the array configuration being used in the deployment to be able to design the weights which gives the final desired elevation weights once the codebook weights are applied across the ports.

Once the non-overlapping and over-lapping beams have been designed, the system (e.g., an eNB 107) would perform the real-time use procedure 835, which includes blocks 840, 850, 860, and 870. In block 840, the CRS (common reference signals) or CSI-RS (channel state information reference signals) are transmitted using the permuted (overlapping) beams. That is, reference signals (e.g., CRS or CSI-RS) are transmitted to user equipment from an active antenna array system comprising a plurality of antennas arrayed in at least a vertical direction. The active antenna array system is configured to perform the transmitting of the reference signals using multiple vertical beams having vertical patterns designed to provide desired vertical patterns after codebook feedback from a codebook is applied on transmissions from logical ports of the antenna array. In an exemplary embodiment, the active antenna array system is configured to perform the transmitting of the reference signals using multiple beams having similar vertical patterns projecting to approximately a same vertical sector. In block 850, the eNB 107 receives codebook feedback (e.g., PMI) from user equipment where the codebook feedback is based on the transmitted reference signals. The codebook feedback will be a selection by the UE of one of the entries from the codebook.

In block 870, the eNB transmits information using the non-overlapping beams. More particularly, information is transmitted to the user equipment at least by applying the selected entries of the codebook to logical ports of the antenna array. As long as the selected codebook entries had the aforementioned product structure, the application of the selected entries causes the active antenna array system to perform the transmitting information using multiple beams having the aforementioned desired vertical patterns (e.g., having different vertical patterns projecting to different vertical sectors).

Matrix examples (used in block 830) are as follows. For a 4 Tx codebook, the following 2×2 matrices may be used:

$$\frac{1}{\sqrt{2}}\begin{bmatrix} 1 & 1 \\ 1 & -1 \end{bmatrix} \text{ and } \frac{1}{\sqrt{2}}\begin{bmatrix} 1 & -j \\ 1 & j \end{bmatrix}.$$

For an 8 Tx codebook, the following 4×4 matrices may be used:

$$\frac{1}{2}\begin{bmatrix} 1 & 1 & 1 & 1 \\ 1 & -j & -1 & j \\ 1 & -1 & 1 & -1 \\ 1 & j & -1 & -j \end{bmatrix} \text{ and } \frac{1}{2}\begin{bmatrix} 1 & e^{-j\pi/4} & e^{-j\pi/2} & e^{-j3\pi/4} \\ 1 & e^{-j3\pi/4} & e^{j\pi/2} & e^{-j\pi/4} \\ 1 & e^{j3\pi/4} & e^{-j\pi/2} & e^{j\pi/4} \\ 1 & e^{j\pi/4} & e^{j\pi/2} & e^{j3\pi/4} \end{bmatrix}.$$

The 8 Tx matrices may be chosen by selecting orthogonal columns from the first four rows of the LTE 8 Tx CB. When the 8Tx CB is applied to the matrix, this will result in beam selection across the elevation ports (meaning that the transmission of step 870 will result in one of the desired beams, e.g., the non-overlapping beams).

For an arbitrary codebook, the design of the matrix would start with finding which codebook vectors have the aforementioned product structure. Then the appropriate elevation vectors of the product structure are extracted and orthogonal elevation vectors from the ones extracted are used to create a matrix B whose columns are the orthogonal extracted vectors. For example with the 4 Tx LTE codebook, entry 12 has the product structure and is created with the elevation vector $[1\ 1]^T$ and entry 11 has the product structure and is created with the elevation vector $[1\ -1]^T$. Then B=[1 1;1 -1] (where ";" separates the rows of B). The matrix is chosen as a unitary matrix so that when B is multiplied by the matrix the result is a scaled identity matrix (an identity matrix is a matrix of zeros except along the main diagonal which is all ones).

Figure 10B:
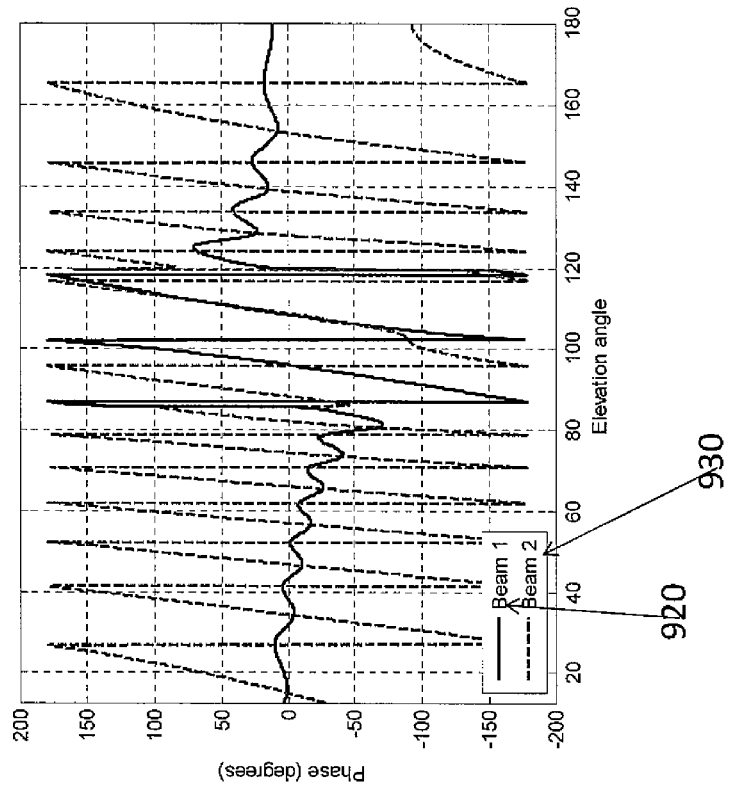
FIG. 10B is a graph of phase of the two beams for the same embodiment.
Figure 10A:
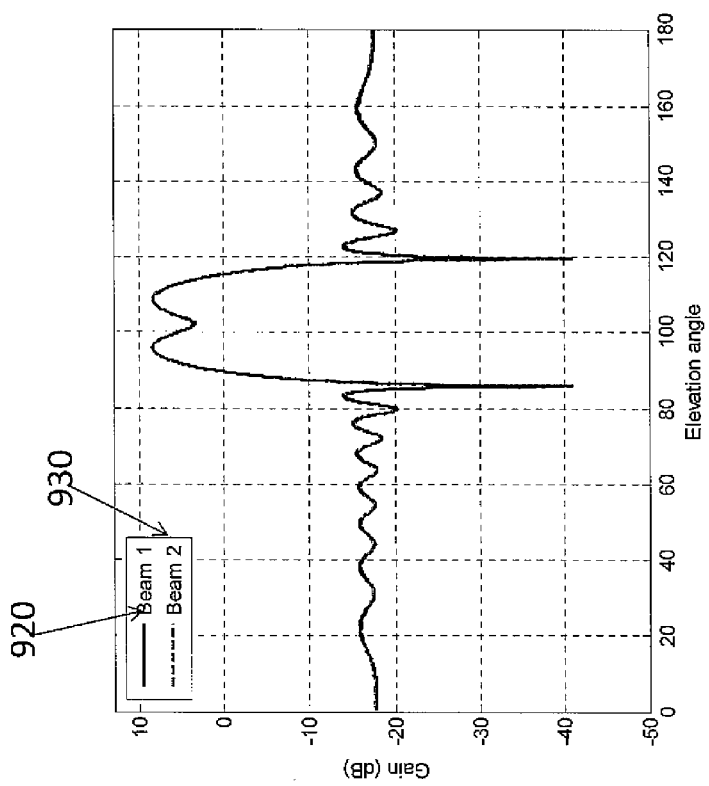

The following example is provided for an E=2, 4 Tx codebook scenario. In this example, two new beams (illustrated in FIGS. 10A and 10B) are created that are the sum and difference of the beams 610 and 615 illustrated in FIG. 6. That is, one new beam, beam 1 920, is the sum of beams 610 and 615 and one new beam, beam 2 930, is the difference of beams 610 and 615. FIG. 10A is graph of gain of the two new beams, while FIG. 10B is a graph of phase of the two new beams. It should be noted that the two elevation ports (beams) have the same pattern in magnitude (FIG. 10A), but the phase (FIG. 10B) differences enables good steering ability with equal-gain weights like the elevation vectors of the codebook vectors which have the product structure. Now, when some elements of the LTE codebook are applied, the beam selection previously described is enabled (i.e., some codebook entries will result in beam 610 in elevation and others will result in beam 615 in elevation).

Figure 11A:
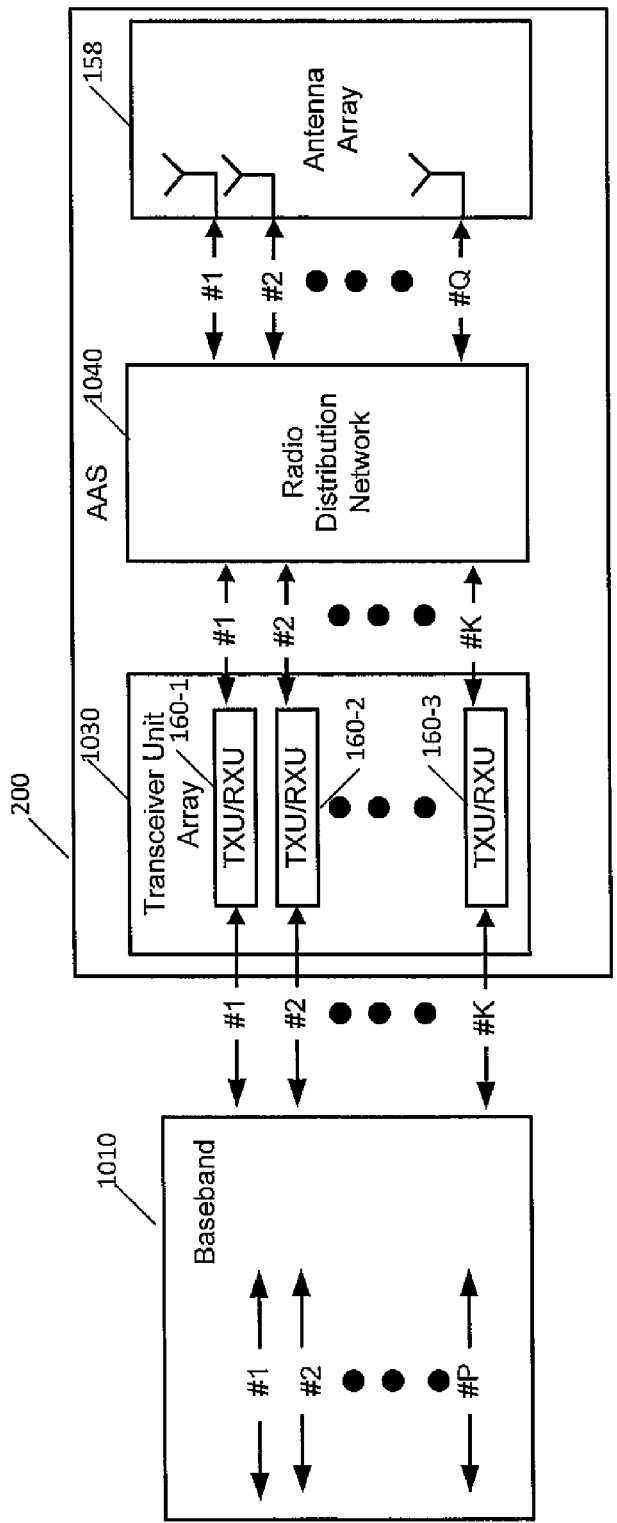
FIG. 11A is a block diagram of an eNB and is used for a specific example.

A more specific example is now presented. This example uses FIG. 11A, which shows a portion of eNB 107. FIG. 11A is similar to FIGS. 4.2-1 in 3GPP TR 37.840 V12.0.0 (2013-03). Additional description of the elements shown in FIG. 11A may be found in that technical report, e.g., at section 4.2, "Structure of AAS BS". This portion of eNB 107 includes baseband circuitry having P ports that are mapped (not shown) to K transceivers 160. The baseband circuitry 1010 is connected to the AAS 200. The K transceivers 160 are part of a transceiver unit array 1030 that forms part of the AAS 200. Each of the K transceivers 160 includes a Transmitter Unit (TXU) and a Receiver Unit (RXU). The radio distribution network (RDN) 1040 performs mapping between the transceiver array unit 1030 and the antenna array 158. The RDN may consist of a simple one to one mapping between the TXU(s)/RXU(s) and the passive Antenna Array. In this case, the RDN would be a logical entity but not necessarily a physical entity. No specific mapping between TXU/RXU and antenna elements is assumed. Further the number of separate receiver and transmitter units as well as the mapping in the RDN between transceivers and radiating elements can differ between the transmit and receive directions. The AAS reference architecture allows for full asymmetry between receiver path and transmit path. This specific example uses the port structure shown in FIG. 11B for the AAS 200 of FIG. 11A. The AAS 200 and baseband unit 1010 of FIG. 11A is repeated for each polarization and may be identical on each polarization. For example if P=2 and there are two polarizations, the result would be four total ports (two per polarization) as shown in FIG. 11B.

Figure 11B:
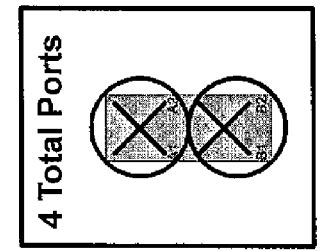
FIG. 11B is an example of a port structure implemented in the AAS of FIG. 11A.

Consider beamspace methodology with the AAS 200 of FIG. 11A with the port structure shown in FIG. 11B. Beam weights V1 & V2 are applied in the baseband unit 1010 on +45 elements to form ports A1 and B1 (see FIG. 11B) respectively. In a similar manner, beam weights V1 & V2 are applied on −45 elements to form ports A2 and B2 (see FIG. 11B) respectively. Beams corresponding to V1, V2 may be fixed and non-adaptive, although 4 total ports are created: A1, A2, B1, and B2. Concerning PMI feedback with TM9 or TM10, CRS/CSI-RS is transmitted over the 4 total ports (A1, A2, B1, B2) and the UE selects and feeds back PMI from the 4 Tx codebook. For codebook vectors or matrices with the product structure (i.e., made up of the Kronecker product of an elevation vector with an azimuth vector or matrix) then the part of the codebook vector or matrix that corresponds to the elevation vector is applied across A1 and B1 (and also A2 and B2).

A problem is how to design beamspace beams corresponding to vectors V1, V2. Furthermore, a goal is to realize UE-specific elevation beam-forming in a manner transparent to the standard. That is, it is desirable to design the beam weights V1, V2 so that the PMI selected by the UE will ultimately steer towards the UE in the elevation dimension in a controlled manner.

Figure 12A:
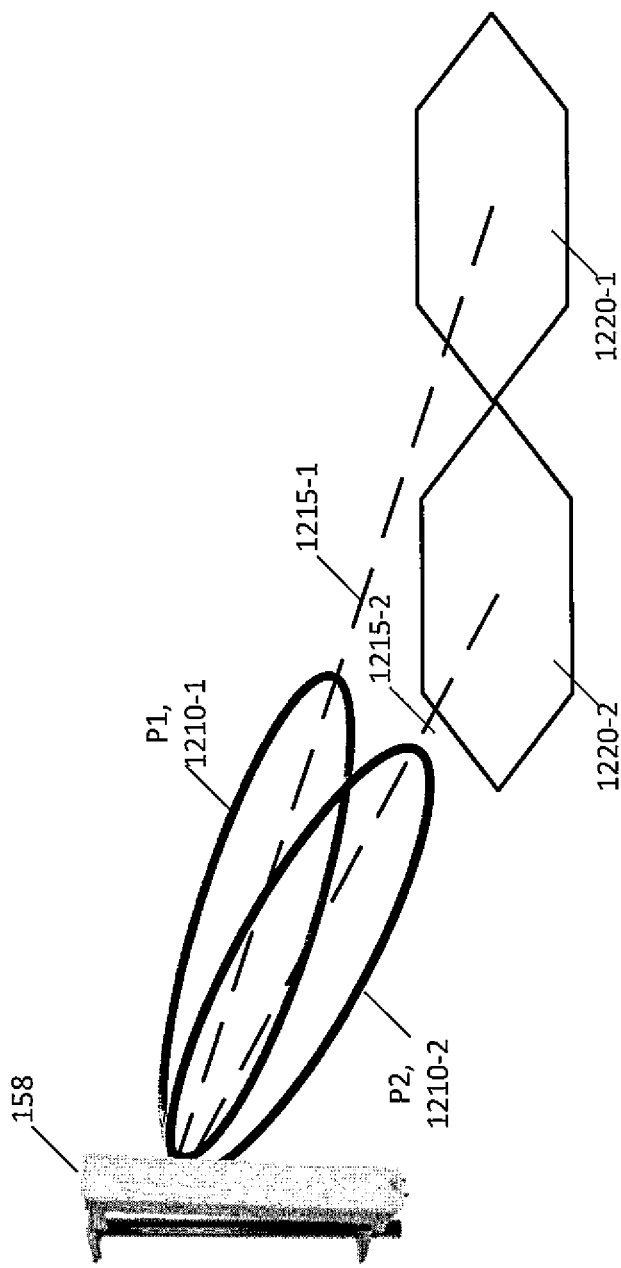
FIG. 12A is an example of two non-overlapping beams (per polarization) illustrating desired patterns after codebook entries, having product structure, corresponding to received PMIs are applied.

The following examples refer to FIG. 12A, which is an example of two non-overlapping beams 1210-1, 1210-2 (per polarization) illustrating desired patterns after codebook entries (having product structure) corresponding to received PMIs have been applied. These examples also refer to FIG. 12B, which is an example of two overlapping beams 1230-1 and 1230-2. In FIG. 12A, there is a beam 1210-1 (referred to as vertical pattern P1 and corresponding to beam weight W1) and a beam 1210 (referred to as a vertical pattern P2 and corresponding to beam weight W2). Each of the beams 1210 corresponds to a different (e.g., non-overlapping) vertical sector 1220. In this example, a centerline 1215 corresponds to a center (e.g., by gain) of an associated beam 1210 and to a center (e.g., in space) of an associated vertical sector 1220.

Figure 12B:
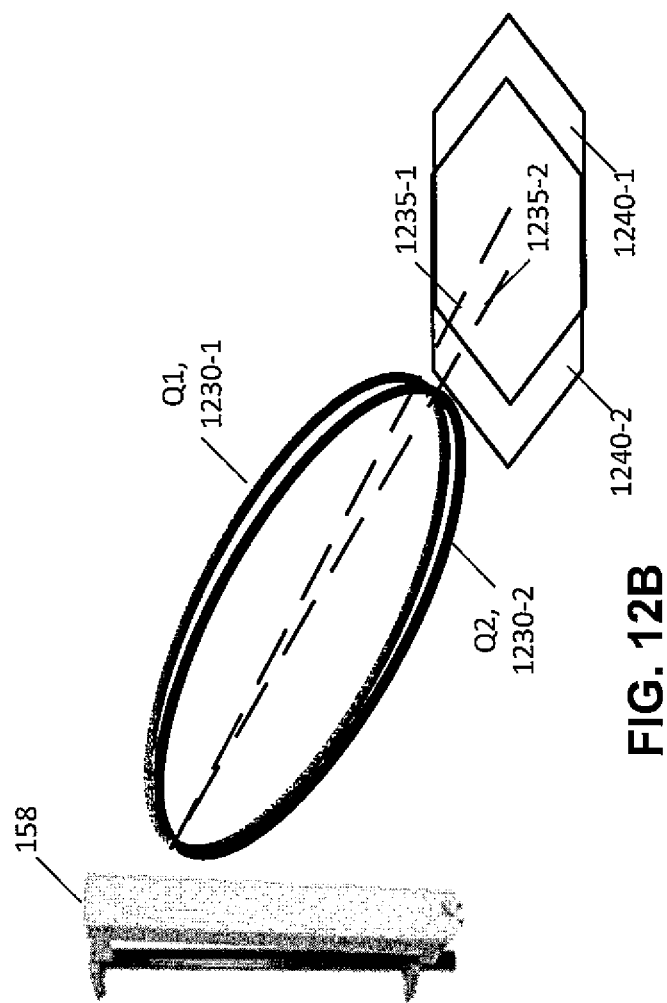
FIG. 12B is an example of two overlapping beams (per polarization) illustrating beamspace patterns to be designed.

In FIG. 12B, there is a beam 1230-1 (referred to as vertical pattern Q1 and corresponding to beam weight V1) and a beam 1230-2 (referred to as vertical pattern Q2 and corresponding to beam weight V2). Beam 1230-1 has a centerline 1235-1 and a vertical sector 1240-1, while beam 1230-2 has a centerline 1235-2 and a vertical sector 1240-2. It can be seen that the vertical sectors 1240-1, 1240-2 are overlapping to quite a large degree. The centerlines are defined by the highest gain, for instance.

Beam patterns P1 and P2 are non-overlapping as the two beams 1210-1 and 1210-2 cover different parts of the space (as illustrated by vertical sectors 1220-1 and 1220-2). Beam patterns Q1 and Q2 are overlapping, as these two beams cover a similar space (as illustrated by vertical sectors 1240-1 and 1240-2). To transmit the reference symbols (see block 840 of FIG. 9) with the over-lapping beams (Q1 and Q2), the eNB 107 can transmit one of the beams (e.g., Q1) without transmitting the other one (e.g., Q2). That is allowed since one port (e.g., one transmitting reference symbols using beam Q1) can send reference symbols on different frequencies as a different port (e.g., the one transmitting reference symbols using beam Q2). So one elevation port uses Q1 and the other elevation port uses Q2.

It is desirable for UEs that are far away from the eNB to have a vertical pattern that resembles beam pattern P1 (beam 1210-1). A 4×1 weight vector W1 when applied across the four ports in FIG. 11B produces pattern P1. It is desirable for UEs that are near to the eNB to have a vertical pattern that resembles beam pattern P2 (beam 1200-2). A 4×1 weight vector W2 when applied across the four ports in FIG. 11B produces pattern P2.

One cannot simply use weights W1 (P1) and W2 (P2) as V1 and V2, respectively, since there are no codebook entries that when applied to the four total ports will select amongst P1 or P2 in elevation (since all entries in the codebook are compliant with a constant modulus property). In other words there are no codebook entries equal to W1 or W2 in codebooks with the constant modulus property since W1 and W2 will need to have elements which are zero to be able to select between P1 and P2.

Certain entries in the codebook already have the following product structure that effectively steers in azimuth separately from elevation:

1) Phase difference applied between A1 and B1 is the same as phase difference applied between A2 and B2 (this performs elevation steering); and 2) Phase difference applied between A1 and A2 is the same as phase difference applied between B1 and B2 (this performs azimuth steering).

For the LTE 4 Tx Rank 1 codebook:

1) Entries 1, 3, 10, 12 effectively apply [1] to both A1-B1 and A2-B2 (which can effectively steer a beam vertically upward); and 2) Entries 2, 4, 9, 11 effectively apply [1 −1] to both A1-B1 and A2-B2 (which can effectively steer a beam vertically downward).

An exemplary design procedure is as follows. Given beam weight W1 (pattern P1) and beam weight W2 (pattern P2), design beam weight V1 (pattern Q1) and beam weight V2 (pattern Q2) so that when the codebook entries that steer in elevation are applied to the four ports, the resulting vertical pattern on both polarizations is either P1 or P2. The beam weights V1, V2 are designed so that when any of the codebook entries [1 3 10 12] are selected, the effective [1 1] steering from those PMI values produces pattern P1 (beam weight W1). Similarly, the beam weights V1, V2 are designed so that when any of codebook entries [2 4 9 11] are selected, the effective [1 −1] steering from those entries produces pattern P2 (beam weight W2).

Relationships to be solved (W1, W2 are known, V1, V2 are to be solved) are the following (see also block 830 of FIG. 9):

$$[w1 \ w2] = \frac{1}{\sqrt{2}}[v1 \ v2]\begin{bmatrix} 1 & 1 \\ 1 & -1 \end{bmatrix}$$

(for codebook entries [1 3 10 12] and
[2 4 9 11] from the *LTE*4 *Tx* codebook).

In another embodiment, other codebook entries from the LTE codebook which have the product structure (i.e., codebook entries that steer in elevation) could be used. Specifically entries [5 7] perform an effect elevation steering of [1 j] and [6 8] perform an effect elevation steering of [1 −j]. In this case W1 and W2 can be found as:

$$[w1 \ w2] = \frac{1}{\sqrt{2}}[v1 \ v2]\begin{bmatrix} 1 & -j \\ 1 & j \end{bmatrix}$$

(for codebook entries [5 7] and [6 8]).

A UE 110 bases its PMI (or other codebook feedback) off of the beams 1230-1 and 1230-2 corresponding to beam patterns Q1 and Q2 and feeds back the PMI (or other codebook feedback) to the eNB 107 (see block 850 of FIG. 9). The fed back PMI consequently causes selection of codebook entries that then select either the beam 1210-1 (beam pattern P1) or the beam 1210-2 (beam pattern P2).

It is noted that for the other entries in the codebook not described above, these entries are unlikely to be selected, but if they are selected, the elevation dimension would steer some other direction. The other entries, 13-16, do not have the product structure and would actually point differently on each polarization (which is unlikely, but in few cases could be best for a UE). All those other entries are considered to be "don't cares" as far as the design procedure goes.

Embodiments of the present invention may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memory(ies) 155 or other device) that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:

| | |
|---|---|
| AAS | Active Antenna Array System |
| BS | Base Station |
| CB | CodeBook |
| CRS | Cell (or Cell-specific) Reference Signal |
| CSI-RS | Channel State Information-Reference Signal |
| DL | DownLink |
| DT | DownTilt |
| eNB | evolved Node B (e.g., LTE base station) |
| LTE | Long Term Evolution |
| PMI | Precoding Matrix Indicator |
| Rel | Release |
| RF | Radio Frequency |
| Rx | Reception or Receiver |
| TM | Transmission Mode |
| TR | Technical Report |
| Tx | Transmission or Transmitter |
| UE | User Equipment |
| Xpol | Cross-polarize or polarized |

What is claimed is:

1. A method, comprising:
transmitting reference signals to user equipment from an active antenna array system comprising a plurality of antennas arrayed in at least a vertical direction, the active antenna array system configured to perform the transmitting of the reference signals using multiple vertical beams having vertical patterns designed to provide desired vertical patterns after codebook feedback from a codebook is applied on transmissions from logical ports of the antenna array;
receiving codebook feedback from the user equipment in response to transmitting the reference signals; and
transmitting information to the user equipment at least by applying selected entries of the codebook corresponding to the codebook feedback to the logical ports of the antenna array, wherein application of the selected entries causes the active antenna array system to perform transmitting information using multiple beams having the desired vertical patterns.

2. The method of claim 1, wherein the desired patterns have different vertical patterns projecting to different vertical sectors.

3. The method of claim 1, wherein the multiple vertical beams have similar vertical patterns projecting to approximately a same vertical sector.

4. The method of claim 1, wherein the codebook is the 4 Tx long term evolution codebook.

5. The method of claim 1, wherein the codebook is the 8 Tx long term evolution codebook.

6. The method of claim 1, wherein the codebook feedback comprises precoding matrix indicators.

7. An apparatus, comprising:
one or more processors; and
one or more memories including computer program code, the one or more memories and the computer program code configured, with the one or more processors, to cause the apparatus to perform at least the following:
transmitting reference signals to user equipment from an active antenna array system comprising a plurality of antennas arrayed in at least a vertical direction, the active antenna array system configured to perform the transmitting of the reference signals using multiple vertical beams having vertical patterns designed to provide desired vertical patterns after codebook feedback from a codebook is applied on transmissions from logical ports of the antenna array;
receiving codebook feedback from the user equipment in response to transmitting the reference signals; and
transmitting information to the user equipment at least by applying selected entries of the codebook corresponding to the codebook feedback to the logical ports of the antenna array, wherein application of the selected entries causes the active antenna array system to perform transmitting information using multiple beams having the desired vertical patterns.

8. The apparatus of claim 7, wherein the desired patterns have different vertical patterns projecting to different vertical sectors.

9. The apparatus of claim 7, wherein the multiple vertical beams have similar vertical patterns projecting to approximately a same vertical sector.

10. The apparatus of claim 7, wherein the codebook is the 4 Tx long term evolution codebook.

11. The apparatus of claim 7, wherein the codebook is the 8 Tx long term evolution codebook.

12. The apparatus of claim 7, wherein the codebook feedback comprises precoding matrix indicators.

13. The apparatus of claim 7, further comprising the active antenna array system.

14. The apparatus of claim 7, wherein the apparatus comprises a base station comprising the one or more memories and the one or more processors.

15. A computer program product comprising a non-transitory memory bearing computer program code embodied therein for use with a computer, the computer program code comprising:
code for transmitting reference signals to user equipment from an active antenna array system comprising a plurality of antennas arrayed in at least a vertical direction, the active antenna array system configured to perform the transmitting of the reference signals using multiple vertical beams having vertical patterns designed to provide desired vertical patterns after codebook feedback from a codebook is applied on transmissions from logical ports of the antenna array;
code for receiving codebook feedback from the user equipment in response to transmitting the reference signals; and
code for transmitting information to the user equipment at least by applying selected entries of the codebook corresponding to the codebook feedback to the logical ports of the antenna array, wherein application of the selected entries causes the active antenna array system to perform transmitting information using multiple beams having the desired vertical patterns.

16. The computer program product of claim 15, wherein the desired patterns have different vertical patterns projecting to different vertical sectors.

17. The computer program product of claim 15, wherein the multiple vertical beams have similar vertical patterns projecting to approximately a same vertical sector.

18. The computer program product of claim 15, wherein the codebook is the 4 Tx long term evolution codebook.

19. The computer program product of claim 15, wherein the codebook is the 8 Tx long term evolution codebook.

20. The computer program product of claim 15, wherein the codebook feedback comprises precoding matrix indicators.

* * * * *